US012644187B2

(12) United States Patent
Hu et al.

(10) Patent No.: US 12,644,187 B2
(45) Date of Patent: Jun. 2, 2026

(54) METALLIZED POLYMER PARTICLES AND RELATED METHODS

(71) Applicant: Xerox Corporation, Norwalk, CT (US)

(72) Inventors: Nan-Xing Hu, Oakville (CA); Yulin Wang, Oakville (CA); Sandra J. Gardner, Oakville (CA)

(73) Assignee: Xerox Corporation, Norwalk, CT (US)

( * ) Notice: Subject to any disclaimer, the term of this patent is extended or adjusted under 35 U.S.C. 154(b) by 751 days.

(21) Appl. No.: 17/559,653

(22) Filed: Dec. 22, 2021

(65) Prior Publication Data

US 2023/0193470 A1     Jun. 22, 2023

(51) Int. Cl.
| | |
|---|---|
| *C23C 18/16* | (2006.01) |
| *C08J 3/05* | (2006.01) |
| *C08J 3/14* | (2006.01) |
| *C23C 18/31* | (2006.01) |

(52) U.S. Cl.
CPC ............. *C23C 18/1641* (2013.01); *C08J 3/05* (2013.01); *C08J 3/14* (2013.01); *C23C 18/31* (2013.01); *C08J 2377/00* (2013.01)

(58) Field of Classification Search
CPC ........ C23C 18/1641; C23C 18/31; C08J 3/05; C08J 3/14; C08J 2377/00
USPC ........................................................ 523/204
See application file for complete search history.

(56) References Cited

U.S. PATENT DOCUMENTS

| | | | |
|---|---|---|---|
| 2017/0294546 A1* | 10/2017 | Ghidiu ................. | H10H 20/833 |
| 2019/0143656 A1* | 5/2019 | Lin ......................... | B32B 9/007 |
| | | | 428/164 |

FOREIGN PATENT DOCUMENTS

| | | | | | |
|---|---|---|---|---|---|
| AU | 2021287460 A1 | * | 2/2023 | | |
| CN | 106366409 A | * | 2/2017 | ............... | C08K 3/04 |
| JP | 2018145402 A | * | 9/2018 | | |
| WO | 2008130081 | | 10/2008 | | |
| WO | WO-2021248216 A1 | * | 12/2021 | | |

OTHER PUBLICATIONS

Zhao et al., CN 106366409 A machine translation in English, Feb. 1, 2017. (Year: 2017).*
Ikeda et al., JP 2018-145402 A machine translation in English, Sep. 20, 2018. (Year: 2018).*

* cited by examiner

*Primary Examiner* — David T Karst
(74) *Attorney, Agent, or Firm* — Vorys, Sater, Seymour and Pease LLP

(57) ABSTRACT

Metallized polymer particle compositions may comprise polymer particles, and a metal coating on an outer surface of at least a portion of the polymer particles. The metal coating comprises a plating metal and overlays a plurality of two-dimensional conductive nanoparticles and a catalyst metal. The metal coating may be formed by at least an electroless plating process conducted in the presence of the catalyst metal. The polymer particles may comprise thermoplastic polymer particles.

15 Claims, 6 Drawing Sheets

METALLIZED POLYMER PARTICLES AND RELATED METHODS

FIELD

The present disclosure relates to metallized polymer particles and methods related thereto.

BACKGROUND

Metal particles like metal flakes, metal wires, metal microparticles, and metal nanoparticles, for example, are used in a variety of applications including coatings, composites, and adhesives to provide electrical conductivity and/or shielding against electromagnetic interference. However, metal particles often have to be present at a high concentration so that a percolation threshold is reached where the metal particles are sufficiently interconnected and/or touching to achieve a desired property or functionality. High metal concentrations in various applications may be problematic in terms of excessive weights and/or metal cost.

Metallized glass microspheres are one alternative that has been explored for addressing the foregoing issues associated with metal particles. Metallized glass microspheres are hollow or solid glass microparticles that have a metal coating on their outer surface. The metal coating may be applied, for example, by vacuum metallization. While metallized glass microspheres are suitable replacements for metal particles in some applications, the glass core may limit applicability in other instances, such as in applications where high impact strength and flexibility are needed and the glass core is otherwise prone to failure. In addition, vacuum metallization techniques may be expensive to conduct as well.

SUMMARY

The present disclosure relates to metallized polymer particles and methods related thereto.

In some embodiments, the present disclosure provides metallized polymer particle compositions comprising: polymer particles; and a metal coating on an outer surface of at least a portion of the polymer particles, the metal coating comprising a plating metal and overlaying a plurality of two-dimensional conductive nanoparticles and a catalyst metal. Optionally, the polymer particles may comprise a thermoplastic polymer.

In other embodiments, the present disclosure provides methods for making metallized polymer particle compositions. The methods comprise: providing polymer particles comprising a plurality of two-dimensional conductive nanoparticles and a catalyst metal on an outer surface of at least a portion of the polymer particles; and performing electroless plating upon the outer surface of the polymer particles using a plating metal precursor to form metallized polymer particles having a metal coating upon the outer surface of the polymer particles; wherein the metal coating comprises a plating metal, and overlays the plurality of two-dimensional conductive nanoparticles and the catalyst metal. Optionally, the polymer particles may comprise a thermoplastic polymer.

In still other embodiments, the present disclosure provides processes comprising: depositing a particulate composition comprising a first plurality of particles comprising a metallized polymer particle composition of the present disclosure and optionally a second plurality of particles comprising thermoplastic polymer particles lacking a metal coating; and consolidating a portion of the particulate composition to form a consolidated body comprising a metal. Optionally, depositing and consolidating may take place in a powder bed during an additive manufacturing process.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
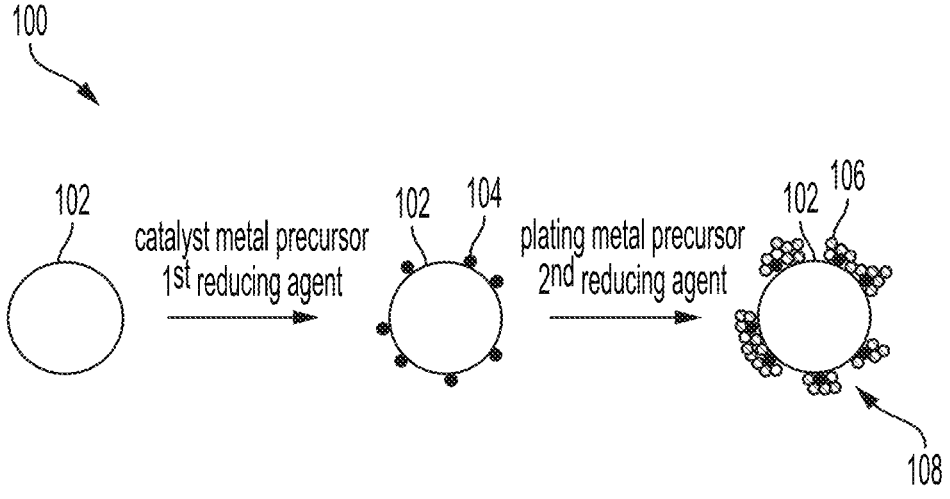
FIGS. 1 and 2 are diagrams of non-limiting example methods for electroless plating of polymer particles, according to the disclosure herein.

The present disclosure relates to metallized polymer particles and methods related thereto.

As discussed above, there are issues of excessive weight and cost associated with metal particles in various applications. Alternative solutions, such as metallized glass microparticles, may address some of the shortcomings of metal particles, but metallized glass microparticles may not be applicable in all situations.

In response to the foregoing, the present disclosure provides metallized polymer particles that may be readily produced using electroless plating methods. Electroless plating, also known as chemical plating or autocatalytic plating, creates a metal coating on a surface using chemical reduction of a plating metal precursor. In the present disclosure, deposition of a metal coating upon polymer particles, such as thermoplastic polymer particles, may be achieved by first depositing catalyst metal, such as palladium, on an outer surface of polymer particles, thereby facilitating subsequent nucleation of a plating metal, such as nickel or copper, through appropriate electroless plating methods.

Additionally, a plurality of two-dimensional conductive nanoparticles may be deposited on the outer surface of the polymer particles as well. The two-dimensional conductive nanoparticles may facilitate deposition of the catalyst metal, promote formation of a more complete metal coating upon the outer surface, increase adherence of the metal coating onto the outer surface, and/or decrease the loading of catalyst metal needed to facilitate formation of a continuous or near-continuous metal coating. Without being bound by any theory or mechanism, the electrical conductivity of the two-dimensional conductive nanoparticles may work in conjunction with the catalyst metal to provide an additional conductive surface for electroless plating to take place. That is, the two-dimensional conductive nanoparticles may facilitate more efficient use of the catalyst metal. Accordingly, the metallized polymer particles may have a thicker and more complete metal coating when two-dimensional conductive nanomaterials are used compared to when they are not. Lowering the amount and/or increasing the usage efficiency of the catalyst metal may be desirable, given the expense of Pd and other types of noble metal catalysts.

Electroless plating techniques may produce an even layer of metal on a surface, regardless of the initial surface geometry. Therefore, the initial surface geometry of the polymer particles may be substantially preserved in the methods described herein. Some applications like additive manufacturing and, more specifically, selective laser sintering methods may have narrow size and geometry parameters for particles or powders in order for successful implementation to be realized. Advantageously, electroless plating of polymer particles, such as thermoplastic polymer particles, already having a suitable size and geometry parameters for conducting such applications may maintain such suitability once metallized polymer particles have been formed. Moreover, two-dimensional conductive nanoparticles may be readily incorporated upon the outer surface of polymer particles of appropriate size and/or geometry to realize the further advantages noted above as well.

The metallized polymer particles disclosed herein may serve as suitable replacements for metallized glass microparticles or metal particles in many instances. In addition, the metallized polymer particles disclosed herein may also be utilized in other applications where metallized glass microparticles or metal particles are not particularly suitable, such as in additive manufacturing processes. Use of metallized polymer particles may alleviate the burden associated with the cost and weight of solid metal particles. As a further advantage, the thermoplastic polymer component of thermoplastic polymer particles may be varied to provide desired properties needed for a given application. For example, the thermoplastic polymer of thermoplastic polymer particles may be chosen to have desired properties suitable for a given application, such as high impact strength and/or flexibility. A wide variety of thermoplastic polymers may be utilized for forming thermoplastic polymer particles in a narrow size range and with desired geometry, which may undergo subsequent metallization, as discussed in greater detail hereinafter.

Definitions and Test Methods

Numerical ranges used herein include the numbers recited in the range. For example, the numerical range "from 1 wt % to 10 wt %" includes 1 wt % and 10 wt % within the recited range.

As used herein, the term "conductive" refers to a substance having electrical conductivity.

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt % solubility in each other at 65° C.

A "polymer" has two or more of the same or different mer units. A "homopolymer" is a polymer having mer units that are the same. The term "polymer" as used herein includes, but is not limited to, homopolymers, copolymers, terpolymers, and the like. The term "polymer," as used herein, also includes impact, block, graft, random, and alternating copolymers. The term "polymer" further includes all possible geometrical configurations unless otherwise specifically stated. Such configurations may include isotactic, syndiotactic, and random symmetries.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "nanoparticles" refers to a particulate material having a particle size ranging from about 1 nm to about 500 nm.

As used herein, the term "oxide" refers to both metal oxides and non-metal oxides. For purposes of the present disclosure, silicon is considered to be a metal.

An "olefin," alternatively referred to as "alkene," is a linear, branched, or cyclic compound of carbon and hydrogen having at least one double bond. Further, when a polymer is referred to as "comprising an olefin" or as a "polyolefin," the olefin present in the polymer is the polymerized form of the olefin.

As used herein, when a polymer is referred to as "comprising, consisting of, or consisting essentially of" a monomer, the monomer is present in the polymer in the polymerized form of the monomer or is the derivative form of the monomer. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

As used herein, the term "embed" relative to particles (e.g., nanoparticles) and a surface of a polymer particle refers to the particle being at least partially extended into the surface of the polymer particle such that polymer is in contact with the nanoparticle to a greater degree than would be if the nanoparticle were simply laid on the surface of the polymer particle, thereby contacting the surface tangentially.

As used herein, $D_{10}$, $D_{50}$, $D_{90}$, and diameter span are primarily used herein to describe particle sizes. As used herein, the term "$D_{10}$" refers to a diameter below which 10% (on a volume-based distribution, unless otherwise specified) of the particle population is found. As used herein, the terms "$D_{50}$," "average particle diameter," and "average particle size" refer to a diameter below which 50% (on a volume-based median average, unless otherwise specified) of the particle population is found. As used herein, the term "$D_{90}$" refers to a diameter below which 90% (on a volume-based distribution, unless otherwise specified) of the particle population is found. As used herein, the terms "diameter span," "span" and "span size," when referring to diameter, provides an indication of the breadth of the particle size distribution and is calculated as $(D_{90}-D_{10})/D_{50}$.

Particle diameters and particle size distributions herein may be determined by light scattering techniques using a Malvern MASTERSIZER™ 3000. For light scattering techniques, the control samples were glass beads with a diameter within the range of 15 μm to 150 μm under the tradename Quality Audit Standards QAS4002™ obtained from Malvern Analytical Ltd. Samples were analyzed as dry powders, unless otherwise indicated. The particles analyzed were dispersed in air and analyzed using the AERO S™ dry powder dispersion module with the MASTERSIZER™ 3000. The particle sizes were derived using instrument software from a plot of volume density as a function of size.

As used herein, when referring to sieving, pore/screen sizes are described per U.S.A. Standard Sieve (ASTM E11-17).

As used herein, the term "circularity" refers to how close a particle is to a perfect sphere. To determine circularity, optical microscopy images using flow particle imaging are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle. Herein, the circularity is based on three runs through a SYSMEX FPIA 3000 particle shape and particle size analyzer, where 6,000 to 10,000 particles are analyzed per run. The reported circularity is the median average circularity based on particle number. In the analysis, a threshold for distinguishing the greyscale levels between the background pixels and the particle pixels (e.g., to correct for non-uniform illumination conditions) was set at 90% of the background modal value.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

The crystallization temperature is the temperature at which a polymer crystallizes (i.e., solidifies) into a structured form, naturally or in an artificially initiated process, wherein atoms or molecules are highly organized into a crystal. The crystallization temperature may be measured by Differential Scanning calorimetry (DSC). DSC provides a rapid method for determining polymer crystallinity based on the heat required to melt the polymer. The crystallization temperature (° C.) is measured according to ASTM E794-06(2018) with 10° C./min ramping and cooling rates where the crystallization temperature is determined based on the second heating and cooling cycle.

The crystallinity (%) of a polymer, unless otherwise specified, is determined by ASTM D3418-15. For crystallinity calculations, a 100% crystalline TPU is considered to have an enthalpy of 196.8 J/g.

Mw is the weigh average molecular weight. Unless otherwise noted, Mw has units of g/mol or kDa (1,000 g/mol=1 kDa) and is measured by gel permeation chromatography.

The melt flow index (MFI) is the measure of resistance to flow of a polymer melt under a defined set of conditions (unit: g/10 min) and is measured by ASTM 1238-20 Standard Procedure A at 195° C. using a 2 mm orifice and a 2.16 kg load. Being a measure at a low shear rate condition, MFI is inversely related to molecular weight of the polymer.

As used herein, "tensile modulus" (MPa) of a solid material is a mechanical property that measures stiffness. Tensile modulus is defined as the ratio of tensile stress (force per unit area) to strain (relative deformation) when a material is undergoing elastic deformation. This parameter can be expressed in Pascals or pounds per square inch (psi). ASTM D638-14 can be used to determine tensile modulus of a polymer.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices.

Aerated density ($\rho_{aer}$) is measured per ASTM D6393-14.

Bulk density ($\rho_{bulk}$) is measured per ASTM D6393-14.

Tapped density ($\rho_{tap}$) is measured per ASTM D6393-14.

Hausner ratio ($H_r$) is a measure of the flowability of a powder and is calculated by $H_r=\rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity values at 25° C., unless otherwise specified, and are measured per ASTM D445-19. For commercially procured carrier fluids (e.g., polydimethylsiloxane oil (PDMS)), the kinematic viscosity data cited herein was provided by the manufacturer, whether measured according to the foregoing ASTM or another standard measurement technique.

Metallized Polymer Particles and Electroless Plating Methods of Production

The metallized polymer particles described herein may be produced using electroless plating methods. Such electroless plating methods build up a coating on an outer surface of the polymer particles, where the coating comprises a plating metal and overlays a catalyst metal, which may both be transition metals in various embodiments. The catalyst metal and the plating metal may differ from one another, or they may comprise the same metal in some instances. Suitable transition metals for the catalyst metal and the plating metal are further specified below. Optionally, but desirably, the metal coating may overlay two-dimensional conductive nanoparticles in addition to the catalyst metal, so that the coverage and/or amount of plating metal deposited upon the polymer particles increases. The catalyst metal and two-dimensional conductive nanoparticles need not necessarily form a continuous layer upon the outer surface of the polymer particles in order for the metal coating to be deposited according to the disclosure herein.

Figure 2:
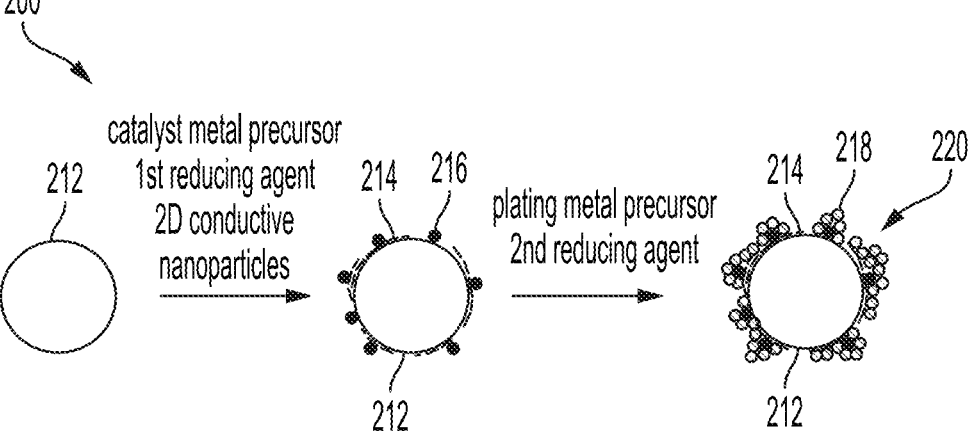

FIGS. 1 and 2 are diagrams of non-limiting example methods for electroless plating of polymer particles, according to the disclosure herein.

In electroless plating method 100 of FIG. 1, polymer particle 102 is exposed to a catalyst metal precursor (e.g., a first transition metal compound) and a first reducing agent. Such exposure may occur simultaneously or stepwise. For example, polymer particle 102 may first be contacted with the catalyst metal precursor so that at least a portion of the catalyst metal precursor is disposed on an outer surface of polymer particle 102. Then, catalyst metal precursor upon polymer particle 102 may be exposed to the first reducing agent to cause the catalyst metal precursor to form catalyst metal 104. Exposure of the catalyst metal precursor and the first reducing agent, whether simultaneously or stepwise, may occur one or more times.

Once catalyst metal 104 is located on the outer surface of polymer particle 102, exposure to electroless plating conditions takes place by contacting a plating metal precursor (e.g., a second transition metal compound different than the catalyst metal precursor) and a second reducing agent with catalyst metal 104 to cause plating metal 106 to deposit on the outer surface of polymer particle 102 in proximity to catalyst metal 104, thereby forming metallized polymer particle 108 having an at least partial metal coating disposed on the outer surface. The first reducing agent and the second reducing agent may be the same or different. The at least partial metal coating may cover a portion of the outer surface of thermoplastic polymer particle 102 or the entirety of the outer surface.

In electroless plating method 200 of FIG. 2, polymer particle 212 is exposed to a catalyst metal precursor, a first reducing agent, and two-dimensional conductive nanoparticles. Said exposure may occur simultaneously or stepwise. For example, polymer particle 212 may first be contacted with the catalyst metal precursor and the two-dimensional conductive nanoparticles, followed by the first reducing agent, so that catalyst metal 216 and surface-bound two-dimensional conductive nanoparticle 214 are disposed on an outer surface of polymer particle 212. Catalyst metal 216 may also be disposed upon surface-bound two-dimensional conductive nanoparticle 214.

In another example, polymer particle 212 may first be contacted with the two-dimensional conductive nanoparticles so that surface-bound two-dimensional conductive nanoparticle 214 is disposed on an outer surface of polymer particle 212. Then, polymer particle 212 and surface-bound two-dimensional conductive nanoparticle 214 may be exposed to the catalyst metal precursor, followed by the first reducing agent, to dispose catalyst metal 216 upon two-dimensional conductive nanoparticle 214 and/or the outer surface of polymer particle 212.

In yet another example, polymer particle 212 may first be contacted with the catalyst metal precursor so that the catalyst metal precursor is disposed on an outer surface of polymer particle 212. Then, the catalyst metal precursor disposed upon polymer particle 212 may be exposed to the first reducing agent to form catalyst metal 216. Thereafter, polymer particle 212 and catalyst metal 216 may be exposed to the two-dimensional conductive nanoparticles to dispose surface-bound two-dimensional conductive nanoparticle 214 upon catalyst metal 216 and/or the outer surface of polymer particle 212. In a still further option, polymer particle 212 and catalyst metal 216 may be contacted with the two-dimensional conductive nanoparticles before being contacted with the first reducing agent.

Other orders for performing the operations in FIGS. 1 and 2, whether simultaneous, stepwise, or a hybrid thereof, are contemplated. Further, exposure of the catalyst metal precursor, the first reducing agent, and the two-dimensional conductive nanoparticles, whether taking place simultaneously or stepwise, may occur one or more times. In some embodiments, the catalyst metal precursor and the two-dimensional conductive nanoparticles may be deposited together, and the catalyst metal may then be produced using the first reducing agent.

Once catalyst metal 216 and surface-bound two-dimensional conductive nanoparticle 214 are located on the outer surface of polymer particle 212, electroless plating may be conducted by contacting a plating metal precursor and a second reducing agent with catalyst metal 216 and surface-bound two-dimensional conductive nanoparticle 214 to deposit plating metal 218 on the outer surface of polymer particle 212 in proximity to catalyst metal 216 and surface-bound two-dimensional conductive nanoparticle 214, thereby forming metallized polymer particle 220 having an at least partial metal coating thereon. The at least partial metal coating may comprise the plating metal and overlay the catalyst metal and the two-dimensional conductive nanoparticle. The first reducing agent and the second reducing agent may be the same or different. The at least partial metal coating may cover a portion of the outer surface of polymer particle 212 or the entirety of the outer surface. For example, the metal coating may be a continuous metal coating that envelops polymer particle 212. Surface-bound two-dimensional conductive nanoparticle 214 may be localized at an interface of the outer surface of polymer particle 212 and metal coating thereon.

Optionally, an adhesion promotor may be further added to enhance the extent of adhesion between the surface-bound two-dimensional conductive nanoparticles and the polymer particles. Illustrative examples of adhesion promotors may include, but are not limited to, a polydopamine or a silane coupling agent containing functional groups that bond with both polymer resin and two-dimensional conductive nanoparticles. Specific examples of silane coupling agents may include an organic compound containing a hydrolyzable silane group and a functional group, such as an amine, a nitrile, an epoxide, a vinyl, a thiol, a phosphonate, or the like. Suitable adhesion promotors may be separately applied to the surface of the polymer particles by known coating techniques. Alternately, the adhesion promoter may be applied along with the two-dimensional conductive nanoparticles through exposing the polymer particles to a mixture containing the two-dimensional conductive nanoparticles and the adhesion promoter. Most two-dimensional conductive nanoparticles contain one or more types of functional groups suitable to react with complementary functional groups upon a silane coupling agent, particularly the silane group, thereby facilitating adhesion when both substances are present.

Accordingly, metallization methods of the present disclosure may comprise: providing polymer particles, such as thermoplastic polymer particles; depositing catalyst metal upon at least a portion of an outer surface of the polymer particles; and performing electroless plating upon the outer surface of the polymer particles using a plating metal precursor to form metallized polymer particles having a metal coating upon the outer surface. The methods may further comprise depositing a plurality of two-dimensional conductive nanoparticles on the outer surface of the polymer particles before performing electroless plating, wherein the metal coating further overlays the plurality of two-dimensional conductive nanoparticles and the catalyst layer.

The polymer particles may comprise thermoplastic polymer particles in any embodiment described herein. The thermoplastic polymer particles of the metallized polymer particles described herein may be tailored for suitability for the ultimate application of the metallized polymer particles. For example, in additive manufacturing, highly spherical metallized polymer particles may be preferred. Accordingly, the thermoplastic polymer particles may be produced by melt emulsification methods, described in more detail hereinbelow, emulsion polymerization methods, or other methods that produce highly spherical thermoplastic polymer particles. For other applications, such as additives for conductive adhesives and pastes, less spherical thermoplastic polymer particles may be tolerated. As such, suitable thermoplastic polymer particles may also be produced by methods including, for example, cryomilling methods, melt emulsification methods, emulsion polymerization methods, and the like.

The thermoplastic polymer of the thermoplastic polymer particles may include, but is not limited to, thermoplastic polyolefins, polyamides, polyurethanes, polyacetals, polycarbonates, polybutylene terephthalate (PBT), polyethylene terephthalate (PET), polyethylene naphthalate (PEN), polytrimethylene terephthalate (PTT), ethylene vinyl acetate copolymer (EVA), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate), polybutadienes, polyisoprenes, styrenic block copolymers, polyacrylonitriles, silicones, the like, and any combination thereof. Copolymers comprising one or more of the foregoing may also be used in the methods and systems of the present disclosure. In some cases, copolymers of PE with polar monomers, such as poly(ethylene-co-vinyl acetate), poly(ethylene-co-methyl acrylate), poly(ethylene-co-glycidyl methacrylate), and poly(ethylene-co-vinyl alcohol) may improve compatibility in polyethylene-poly(methylmethacrylate) (PE/PMMA) blends.

The thermoplastic polymers in the compositions and methods of the present disclosure may be elastomeric or non-elastomeric. Some of the foregoing examples of thermoplastic polymers may be elastomeric or non-elastomeric depending on the exact composition of the polymer.

Thermoplastic elastomers generally fall within one of six classes: styrenic block copolymers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in Handbook of Thermoplastic Elastomers, 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), the like, and any combination thereof.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, the like, and any combination thereof. A polyamide designated by first number, second number is a polyamide having the first number of backbone carbons between the nitrogens for the section having no C=O and the second number of backbone carbons between the two nitrogens for the section having a C=O. A polyamide designated by number(s)\number(s) are a copolymer of the polyamides indicated by the numbers before and after the backslash.

Examples of polyurethanes include, but are not limited to, polyether polyurethanes, polyester polyurethanes, mixed polyether and polyester polyurethanes, the like, and any combination thereof. Examples of thermoplastic polyurethanes include, but are not limited to, poly[4,4'-methylenebis(phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), the like, and any combination thereof.

Polyolefins may be polymers of one or more monomers that may include, but are not limited to, substituted or unsubstituted $C_2$ to $C_{40}$ alpha olefins, preferably $C_2$ to $C_{20}$ alpha olefins, more preferably $C_2$ to $C_{12}$ alpha olefins, such as ethylene, propylene, butene, pentene, hexene, heptene, octene, nonene, decene, undecene, dodecane, and isomers thereof. For example, the polyolefin may comprise propylene and one or more optional comonomers comprising one or more ethylene or $C_4$ to $C_{40}$ olefins, preferably $C_4$ to $C_{20}$ olefins, or more preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another example, the polyolefin may comprise ethylene and one or more optional comonomers comprising one or more $C_3$ to $C_{40}$ olefins, preferably $C_4$ to $C_{20}$ olefins, or more preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups. Examples of specific polyolefins may include, but are not limited to, polyethylene (as a homopolymer or a copolymer having 35 wt % or less of a $C_2$ to $C_{40}$ alpha olefin comonomer), polypropylene (as a homopolymer or a copolymer having 35 wt % or less of a $C_4$ to $C_{40}$ alpha olefin comonomer), ethylene-propylene copolymers, ethylene-propylene-diene copolymers, polybutene, polyisobutylene, polymethylpentene, poly (4-methyl-1-pentene), the like, and any combination thereof.

The thermoplastic polymer may optionally comprise an additive. Typically, the additive may be present in the thermoplastic polymer before forming thermoplastic particles therefrom. The additive may be dispersed throughout the thermoplastic polymer and may be referred to herein as an "internal additive." The internal additive may be blended with the thermoplastic polymer (e.g., as a blend or composite) before forming the thermoplastic polymer particles. The internal additives may be present primarily within the interior of the thermoplastic polymer particles, although some of the internal additives may reside at a surface location as well.

When describing component amounts in the compositions described herein, weight percentages are expressed based on the mass of thermoplastic polymer exclusive of the internal additive (if any). For example, a composition comprising 1 wt % emulsion stabilizer, discussed further below, by weight of 100 g of a thermoplastic polymer blend comprising 10 wt % internal additive and 90 wt % polymer is a composition comprising 0.9 g of emulsion stabilizer, 90 g of polymer, and 10 g of internal additive.

If used, an internal additive may be present in the thermoplastic polymer at about 0.1 wt % to about 60 wt %, or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt % of the thermoplastic polymer. For example, the thermoplastic polymer may comprise about 70 wt % to about 85 wt % of a thermoplastic polymer and about 15 wt % to about 30 wt % of an internal additive such as glass fiber, carbon fiber, or other internal additives provided below. Other examples of suitable internal additives may include, but are not limited to, fillers, strengtheners, pigments, pH regulators, the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), the like, nanoparticles, and any combination thereof. Examples of pigments include, but are not limited to, organic pigments, inorganic pigments, carbon black, the like, and any combination thereof. For example, fillers used herein may include exfoliated graphite (EG), exfoliated graphite nanoplatelets (xGnP), carbon black, carbon nanofibers (CNF), carbon nanotubes (CNT), graphenes, graphene oxides, reduced graphene oxide, graphite oxides, graphene oxide nanosheets, fullerenes, and any combination thereof.

In some instances, internal additives may also include two-dimensional conductive nanoparticles, including one or more of those specified above. When two-dimensional conductive nanoparticles are included as an internal additive, at least a portion of the two-dimensional conductive nanoparticles may extend to the surface of the thermoplastic polymer particles. Two-dimensional conductive nanoparticles extending to the surface of the thermoplastic polymer particles may similarly facilitate electroless plating as described above. Moreover, two-dimensional conductive nanoparticles may be present both upon the outer surface of the polymer particles and as an internal additive in the metallized polymer particles disclosed herein.

Example catalyst metals suitable for promoting electroless plating may include Group 10 and Group 11 metals including but not limited to, copper, silver, palladium, platinum, the like, and any combination thereof. Example catalyst metal precursors for introducing the catalyst metal may include a metal complex or a salt of the catalyst metal, such as a metal fluoride, chloride, bromide, iodide, sulfate, or nitrate salt. Two or more catalyst metal precursors may be used to introduce catalyst metal in some instances. Examples of first reducing agents suitable to form catalyst metal may include, but are not limited to, sodium hypophosphite, borohydride salts, tin (II) salts, the like, and any combination thereof. Other suitable conditions for introducing catalyst metal upon a surface will be familiar to one having ordinary skill in the art.

Exposing or contacting the polymer particles to the catalyst metal precursor and/or the first reducing agent may be achieved by exposing polymer particles to a solution (or dispersion) of the catalyst metal precursor and/or the first reducing agent in a solvent that does not affect the polymer particles, such as through swelling or degradation. Such exposing or contacting may comprise soaking the polymer particles in the solution (or dispersion) with or without agitation and/or stirring, flowing the solution (or dispersion) over the polymer particles, the like, and any combination thereof. Similar exposing or contact methods are applicable when disposing two-dimensional conductive nanoparticles upon the outer surface of the polymer particles. Likewise, such exposing or contacting conditions may be utilized when contacting the plating metal precursor, the second reducing agent, and the like under electroless plating conditions to form the metal coating upon the polymer particles.

Two-dimensional conductive nanoparticles may optionally be deposited upon the outer surface of the polymer particles (or contained within the polymer particles as an internal additive) to promote formation of the metal coating through electroless plating. Suitable two-dimensional conductive nanoparticles may include, but are not limited to, graphene, reduced graphene oxide, a two-dimensional transition metal compound, and any combination thereof. Illustrative examples of two-dimensional transition metal compounds include MXenes, which comprise a layered structure of transition metal carbides, nitrides, or carbonitrides. Suitable transition metals for forming the two-dimensional transition metal compounds may include, but are not limited to, Ti, Mo, V, and any combination thereof. Suitable MXenes may further comprise a surface terminating group, such as a hydrogen, an oxygen, a sulfur, a hydroxyl (OH), a halide (F, Cl, or Br), and any combination thereof.

Reduced graphene oxide (rGO) may be deposited directly onto the outer surface of the polymer particles. Alternatively, graphene oxide (GO) may be deposited on the outer surface of the polymer particles and then reduced to yield reduced graphene oxide (e.g., via chemical reduction using a reducing agent like ascorbic acid or other suitable reducing agent) on the polymer particle. As will be appreciated, chemical reduction of graphene oxide may increase the electrical conductivity of this nanomaterial.

The two-dimensional conductive nanoparticles may be present at about 0.00001 wt % or higher relative to a mass of plating metal in the metal coating, such as about 0.00001 wt % to about 5 wt %, or about 0.0001 wt % to about 0.1 wt %, or about 0.00005 wt % to about 0.05 wt %, or about 0.0005 wt % to about 0.01 wt %, or about 0.001 wt % to about 0.5 wt %, or about 0.00001 wt % to about 0.001 wt %.

Areal coverage of the two-dimensional conductive nanoparticles upon the polymer particles (before incorporation of the metal coating thereon) may range from about 5% to about 100%, or about 10% to about 80%, or about 20% to about 60%.

A mass ratio of the two-dimensional conductive nanoparticles to surface area of the polymer particles (before incorporation of the metal coating thereon) may range from about 0.01 $\mu g/cm^2$ to about 10 $\mu g/cm^2$, or about 0.1 $\mu g/cm^2$ to about 5 $\mu g/cm^2$.

A mass ratio of the two-dimensional conductive nanoparticles to the catalyst metal may range from about 1,000:1 to about 1:1,000, or about 500:1 to about 1:500, or about 1,000:1 to about 500:1 or about 500:1 to about 100:1, or about 100:1 to about 1:1, or about 1:1 to about 1:100, or about 1:100 to about 1:500, or about 1:500 to about 1:1,000, or about 1:1 to about 1:100, or about 1:1 to about 1:25, or about 1:10 to about 1:50, or about 1:25 to about 1:75, or about 1:50 to about 1:100.

A mass ratio of catalyst metal to surface area of the polymer particles (before incorporation of the metal coating thereon) may be about 0.001 $\mu g/cm^2$ or above, or about 0.01 $\mu g/cm^2$ or above, such as illustrative ranges of about 0.001 $\mu g/cm^2$ to about 10 $\mu g/cm^2$, or about 0.01 $\mu g/cm^2$ to about 5 $\mu g/cm^2$. In the foregoing ranges, surface area refers to either the total area of the polymer particles or the combined surface area of the polymer particles and two-dimensional conductive nanoparticles located thereon.

Suitable plating metals for deposition through electroless plating onto the outer surface of the polymer particles or an existing portion of a coating thereon, may include, but are not limited to, copper, silver, gold, nickel, chromium, the like, any alloy thereof, and any combination thereof. The plating metal and the catalyst metal may be the same or different. Example plating metal precursors for introducing the plating metal may include a metal complex (including metal chelates) or a salt of the plating metal, such as a metal fluoride, chloride, bromide, iodide, sulfate, or nitrate salt. Two or more plating metal precursors may be used to introduce the metal coating in some instances. Examples of second reducing agents suitable to form the metal coating from the plating metal precursor may include, but are not limited to, sodium hypophosphite, borohydride salts, formaldehyde, the like, and any combination thereof. The second reducing agent may be the same as or different than the first reducing agent. Other parameters of an electroless plating process are provided below.

A mass ratio of the catalyst metal to the plating metal in the metal coating may be about 1:5 or greater, such as about 1:5 to about 1:10,000, or about 1:1 to about 1:1,000, or about 1:5 to about 1:100, or about 1:5 to about 1:25, or about 1:10 to about 1:50, or about 1:25 to about 1:75, or about 1:50 to about 1:100.

Suitable electroless plating conditions will be familiar to one having ordinary skill in the art and may be employed in the disclosure herein. Copper, for example, may be plated under electroless conditions using copper ethylenediaminetetraacetic acid complex (Cu-EDTA)/formaldehyde. In another particular example, copper-nickel alloys may be plated under electroless conditions using copper hypophosphite in the presence of nickel ions as a mediator. Nickel may be plated under electroless conditions using a nickel salt, such as nickel sulfate, for example, and a reducing agent such as hypophosphite or borohydride.

The metal coating of the metallized polymer particles described herein may cover about 10% to 100%, or about 10% to about 30%, or about 25% to about 60%, or about 50% to about 80%, or about 75% to 100% of the outer surface of the polymer particles. That is, the metal coating may be at least partially continuous. The metal coating may be continuous or substantially continuous in some instances. The coverage of metal coating on the outer surface of the polymer particles may be determined using image analysis of SEM micrographs where elemental analysis images may be useful in ascertaining the locations of the coating (e.g., to detect the location of the metal).

The metal coating of the metallized polymer particles described herein may comprise about 5 wt % to about 50 wt %, or about 5 wt % to about 25 wt %, or about 15 wt % to about 30 wt %, or about 25 wt % to about 50 wt % of a combined mass of the polymer particles and the metal coating.

The thickness of the metal coating on the polymer particles may range from about 0.005 $\mu$m to about 10 $\mu$m, or about 0.01 $\mu$m to about 5 $\mu$m, or about 0.1 $\mu$m to about 5 $\mu$m. The foregoing represent the metal coating thicknesses that may be achieved through electroless plating.

The physical properties of the metallized polymer particles described herein may depend on, among other things, the physical properties of the polymer particles prior to metallization and the types(s) of metals in the metal coating. For thinner metal coatings, the physical properties of the metallized polymer particles like size and shape may be substantially the same as the polymer particles. For thicker metal coatings, the physical properties of the metallized polymer particles may vary more from the physical properties of polymer particles.

The metallized polymer particles may have a BET surface area of about 10 $m^2/g$ to about 500 $m^2/g$, or about 10 $m^2/g$ to about 150 $m^2/g$, or about 25 $m^2/g$ to about 100 $m^2/g$, or about 100 $m^2/g$ to about 250 $m^2/g$, or about 250 $m^2/g$ to about 500 $m^2/g$.

The metallized polymer particles may have a $D_{10}$ of about 0.1 $\mu$m to about 125 $\mu$m, or about 0.1 $\mu$m to about 5 $\mu$m, about 1 $\mu$m to about 10 $\mu$m, about 5 $\mu$m to about 30 $\mu$m, or about 1 $\mu$m to about 25 $\mu$m, or about 25 $\mu$m to about 75 $\mu$m, or about 50 $\mu$m to about 85 $\mu$m, or about 75 $\mu$m to about 125 $\mu$m, a $D_{50}$ of about 0.5 $\mu$m to about 200 $\mu$m, or about 0.5 $\mu$m to about 10 $\mu$m, or about 5 $\mu$m to about 50 $\mu$m, or about 30 $\mu$m to about 100 $\mu$m, or about 30 $\mu$m to about 70 $\mu$m, or about 25 $\mu$m to about 50 $\mu$m, or about 50 $\mu$m to about 100 $\mu$m, or about 75 $\mu$m to about 150 $\mu$m, or about 100 $\mu$m to about 200 $\mu$m, and a $D_{90}$ of about 3 $\mu$m to about 300 $\mu$m, or about 3 $\mu$m to about 15 $\mu$m, or about 10 $\mu$m to about 50 $\mu$m, or about 25 $\mu$m to about 75 $\mu$m, or about 70 $\mu$m to about 200 $\mu$m, or about 60 $\mu$m to about 150 $\mu$m, or about 150 $\mu$m to about 300 $\mu$m, wherein $D_{10} < D_{50} < D_{90}$. The metallized polymer particles may also have a diameter span of about 0.2 to about 10, or about 0.2 to about 0.5, or about 0.4 to about 0.8, or about 0.5 to about 1, or about 1 to about 3, or about 2 to about 5, or about 5 to about 10. Without limitation, diameter span values of 1.0 or greater are considered broad, and diameter spans values of 0.75 or less are considered narrow. Preferably, the metallized polymer particles have a diameter span of about 0.2 to about 1.

In a first non-limiting example, the metallized polymer particles may have a $D_{10}$ of about 0.1 $\mu$m to about 10 $\mu$m, a $D_{50}$ of about 0.5 $\mu$m to about 25 $\mu$m, and a $D_{90}$ of about 3 $\mu$m to about 50 $\mu$m, wherein $D_{10} < D_{50} < D_{90}$. The metallized polymer particles may have a diameter span of about 0.2 to about 2.

In a second non-limiting example, the metallized polymer particles may have a $D_{10}$ of about 5 $\mu$m to about 30 $\mu$m, a $D_{50}$ of about 30 $\mu$m to about 70 $\mu$m, and a $D_{90}$ of about 70 $\mu$m to about 120 μm, wherein $D_{10}<D_{50}<D_{90}$. The metallized polymer particles may have a diameter span of about 1.0 to about 2.5.

In a third non-limiting example, the metallized polymer particles may have a $D_{10}$ of about 25 μm to about 60 μm, a $D_{50}$ of about 60 μm to about 110 μm, and a $D_{90}$ of about 110 μm to about 175 μm, wherein $D_{10}<D_{50}<D_{90}$. The metallized polymer particles may have a diameter span of about 0.6 to about 1.5.

In a fourth non-limiting example, the metallized polymer particles may have a $D_{10}$ of about 75 μm to about 125 μm, a $D_{50}$ of about 100 μm to about 200 μm, and a $D_{90}$ of about 125 μm to about 300 μm, wherein $D_{10}<D_{50}<D_{90}$. The metallized polymer particles may have a diameter span of about 0.2 to about 1.2.

In a fifth non-limiting example, the metallized polymer particles may have a $D_{10}$ of about 1 μm to about 50 μm, or about 5 μm to about 30 μm, or about 1 μm to about 25 μm, or about 25 μm to about 50 μm, a $D_{50}$ of about 25 μm to about 100 μm, or about 30 μm to about 100 μm, or about 30 μm to about 70 μm, or about 25 μm to about 50 μm, or about 50 μm to about 100 μm, and a $D_{90}$ of about 60 μm to about 300 μm, or about 70 μm to about 200 μm, or about 60 μm to about 150 μm, or about 150 μm to about 300 μm, wherein $D_{10}<D_{50}<D_{90}$. The metallized polymer particles may also have a diameter span of about 0.4 to about 3, or about 0.6 to about 2, or about 0.4 to about 1.5, or about 1 to about 3.

The metallized polymer particles may have a circularity of about 0.9 or greater, or about 0.90 to about 1.0, or about 0.93 to about 0.99, or about 0.95 to about 0.99, or about 0.97 to about 0.99, or about 0.98 to 1.0.

The metallized polymer particles may have an angle of repose of about 25° to about 45°, or about 25° to about 35°, or about 30° to about 40°, or about 35° to about 45°.

The metallized polymer particles may have a Hausner ratio of about 1.0 to about 1.5, or about 1.0 to about 1.2, or about 1.1 to about 1.3, or about 1.2 to about 1.35, or about 1.3 to about 1.5.

The metallized polymer particles may have a bulk density of about 0.3 g/cm³ to about 1.5 g/cm³, or about 0.3 g/cm³ to about 1.4 g/cm³, or about 0.4 g/cm³ to about 1.4 g/cm³, or about 0.5 g/cm³ to about 1.5 g/cm³, or about 0.5 g/cm³ to about 1.3 g/cm³, or about 0.5 g/cm³ to about 1.0 g/cm³.

Melt Emulsification Methods and Resultant Thermoplastic Polymer Particles

Highly spherical polymer particles that comprise one or more thermoplastic polymers may be produced by melt emulsification methods. For example, such methods may comprise: combining a thermoplastic polymer and, optionally, an emulsion stabilizer and/or other additives (e.g., a compatibilizer, a two-dimensional conductive nanoparticle, or the like) at a heating temperature at or above a melting point or softening temperature of the thermoplastic polymer and applying sufficient shear to disperse the thermoplastic polymer as liquefied droplets in the carrier fluid; cooling the liquefied droplets below the melting point or softening temperature to form thermoplastic polymer particles, which may be spherical or substantially spherical; and separating the thermoplastic polymer particles from the carrier fluid. Such thermoplastic polymer particles may be provided for formation of a metal coating thereon according to the disclosure herein.

Figure 3:
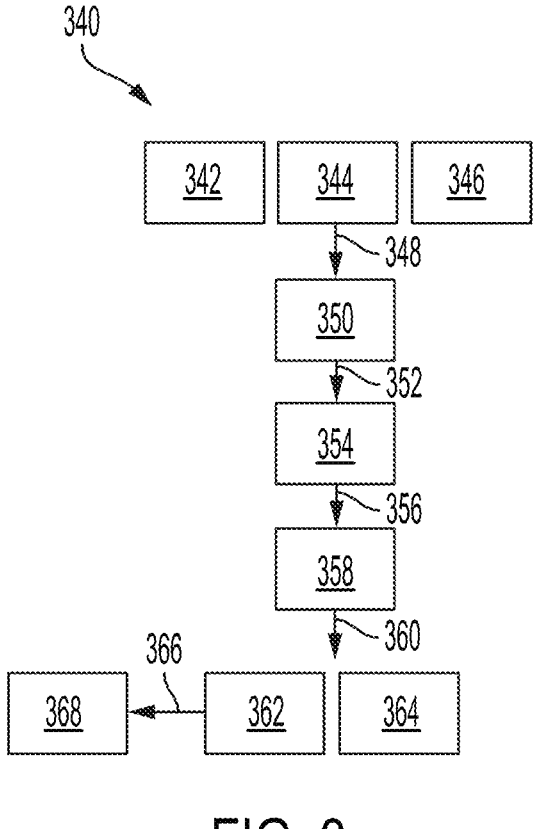
FIG. 3 is a flow chart of a non-limiting example method for melt emulsification production of highly spherical thermoplastic polymer particles.

FIG. 3 is a flow chart of non-limiting example method 340 for melt emulsification production of highly spherical thermoplastic polymer particles. Thermoplastic polymer 342, carrier fluid 344, optionally emulsion stabilizer 346, and optionally other additives 348 (e.g., a compatibilizer, a two-dimensional conductive nanoparticle, and the like) are combined 350 to produce mixture 352. The foregoing components can be added individually or in a blend of components in any order and include mixing and/or heating during the process of combining 350. For example, thermoplastic polymer 342 and other additives 348 may be premixed before combining 350. In another example, emulsion stabilizer 346 may be added while combining 350 and after addition of thermoplastic polymer 342. In still another example, emulsion stabilizer 346 may first be dispersed in carrier fluid 344, optionally with heating the resulting dispersion, before adding thermoplastic polymer 342 and other additives 348, if included. In yet another example, thermoplastic polymer 342 may be heated to produce a polymer melt to which the other optional or other non-optional components may be added together or in any order.

During melt emulsification, the thermoplastic polymer may be present in the mixture (e.g., mixture 352 of FIG. 3) at about 5 wt % to about 60 wt %, or about 5 wt % to about 25 wt %, or about 10 wt % to about 30 wt %, or about 20 wt % to about 45 wt %, or about 25 wt % to about 50 wt %, or about 40 wt % to about 60 wt % of the mixture.

The thermoplastic polymer may be present in the polymer particles (e.g., polymer particles 364/370 of FIG. 3) at about 10 wt % to about 99 wt %, or about 10 wt % to about 80 wt %, or about 60 wt % to about 90 wt %, or about 80 wt % to about 95 wt %, or about 85 wt % to about 98 wt %, or about 90 wt % to about 99 wt % of the polymer particles.

Examples of suitable thermoplastic polymers that may undergo melt emulsification include, but are not limited to, the thermoplastic polymers described above that may form metallized polymer particles The thermoplastic polymer may have a melting point or softening temperature of about 50° C. to about 450° C., or about 50° C. to about 125° C., or about 100° C. to about 175° C., or about 150° C. to about 280° C., or about 200° C. to about 350° C., or about 300° C. to about 450° C.

The thermoplastic polymer may have a glass transition temperature (ASTM E1356-08(2014) with 10° C./min ramping and cooling rates) of about −50° C. to about 400° C., or about −50° C. to about 0° C., or about −25° C. to about 50° C., or about 0° C. to about 150° C., or about 100° C. to about 250° C., or about 150° C. to about 300° C., or about 200° C. to about 400° C.

The thermoplastic polymer may optionally comprise an internal additive as described above with respect to metallized polymer particles.

The carrier fluid may be chosen such that at the various processing temperatures (e.g., from room temperature to process temperature) the thermoplastic polymer and the carrier fluid are immiscible. An additional factor that may be considered is the differences in (e.g., a difference or a ratio of) viscosity at process temperature between the thermoplastic polymer and the carrier fluid. The differences in viscosity may affect droplet breakup and particle size distribution. Without being limited by theory, it is believed that when the viscosities of the thermoplastic polymer and the carrier fluid are too similar, the circularity of the product as a whole may be reduced where the particles are more ovular and more elongated structures are observed.

Suitable carrier fluids may have a viscosity at 25° C. of about 1,000 cSt to about 150,000 cSt, or about 1,000 cSt to about 60,000 cSt, or about 40,000 cSt to about 100,000 cSt, or about 75,000 cSt to about 150,000 cSt. For example, suitable carrier fluids may have a viscosity at 25° C. of about 10,000 cSt to about 60,000 cSt.

Examples of carrier fluids may include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, the like, and any combination thereof. Examples of silicone oils include, but are not limited to, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, the like, and any combination thereof. When the carrier fluid comprises two or more of the foregoing, the carrier fluid may have one or more phases. For example, polysiloxanes modified with fatty acids and polysiloxanes modified with fatty alcohols (preferably with similar chain lengths for the fatty acids and fatty alcohols) may form a single-phase carrier fluid. In another example, a carrier fluid comprising a silicone oil and an alkyl-terminal polyethylene glycol may form a two-phase carrier fluid. In at least one embodiment, the carrier fluid is polydimethylsiloxane (PDMS).

The carrier fluid may be present in the mixture at about 40 wt % to about 95 wt %, or about 75 wt % to about 95 wt %, or about 70 wt % to about 90 wt %, or about 55 wt % to about 80 wt %, or about 50 wt % to about 75 wt %, or about 40 wt % to about 60 wt % of the mixture.

In some instances, the carrier fluid may have a density of about 0.6 $g/cm^3$ to about 1.5 $g/cm^3$, and the thermoplastic polymer may have a density of about 0.7 $g/cm^3$ to about 1.7 $g/cm^3$, wherein the thermoplastic polymer may have a density similar to, lower, or higher than the density of the carrier fluid.

Other additives like emulsion stabilizers, thermoplastic polymers, compatibilizers, the like, and any combination thereof may be included in the mixture and resultant thermoplastic polymer particles produced by melt emulsification.

The emulsion stabilizers used in the methods and compositions of the present disclosure may comprise nanoparticles (e.g., oxide nanoparticles), surfactants, the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 $m^2/g$), AEROSIL® RX50 (about 40 nm average diameter silica nanoparticles having a hydrophobically modified surface and a BET surface area of 35±10 $m^2/g$), AEROSIL® 380 (silica nanoparticles having a hydrophilically modified surface and a BET surface area of 380±30 $m^2/g$), the like, and any combination thereof.

Silica nanoparticles, particularly fumed silica nanoparticles with a hydrophobic functionalization thereon, may be especially suitable for use in the disclosure herein, since a variety of functionalized silicas are available, with the type of hydrophobic functionalization and the particle size being varied. Silazane and silane hydrophobic functionalizations are facile hydrophobic functionalizations that may be used in the present disclosure. As such, the plurality of oxide nanoparticles used in the disclosure herein may comprise or consist essentially of silica nanoparticles, particularly silica nanoparticles that are hydrophobically functionalized. Silica nanoparticles may be used in combination with another type of oxide nanoparticle or non-oxide nanoparticle wherein the other type of oxide or non-oxide nanoparticle may convey properties to the thermoplastic polymer particles, or an object formed therefrom, that are not attained when using silica nanoparticles alone.

The loading and particle size of silica nanoparticles or similar oxide nanoparticles upon thermoplastic polymer particles may vary over a wide range in the disclosure herein. The loading of the silica nanoparticles or similar oxide nanoparticles may be determined by the nanoparticle concentration in a carrier fluid used to promote formation of the thermoplastic polymer particles, as described further below. In non-limiting examples, the concentration of nanoparticles in the carrier fluid may range from about 0.01 wt % to about 10 wt %, or about 0.05 wt % to about 10 wt %, or about 0.05 wt % to about 5 wt %, or about 0.1 wt % to about 2 wt %, or about 0.25 wt % to about 1.5 wt %, or about 0.2 wt % to about 1.0 wt %, or about 0.25 wt % to about 1 wt %, or about 0.25 wt % to about 0.5 wt % with respect to the weight of the thermoplastic polymer. The particle size of the nanoparticles may range from about 1 nm to about 100 nm, although particles sizes up to about 500 nm may also be acceptable. In non-limiting examples, the particle size of the nanoparticles may range from about 5 nm to about 75 nm, or about 5 nm to about 50 nm, or about 5 nm to about 10 nm, or about 10 nm to about 20 nm, or about 20 nm to about 30 nm, or about 30 nm to about 40 nm, or about 40 nm to about 50 nm, or about 50 nm to about 60 nm. The nanoparticles, particularly silica nanoparticles and similar oxide nanoparticles, may have a BET surface area of about 10 $m^2/g$ to about 500 $m^2/g$, or about 10 $m^2/g$ to about 150 $m^2/g$, or about 25 $m^2/g$ to about 100 $m^2/g$, or about 100 $m^2/g$ to about 250 $m^2/g$, or about 250 $m^2/g$ to about 500 $m^2/g$.

Even when silica nanoparticles are utilized to form thermoplastic polymer particulates, the silica nanoparticles may be at least partially removed following melt-emulsification. Suitable techniques for silica removal are addressed further below. As such, in some embodiments, the thermoplastic polymer particles may be free or substantially free of silica.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxy)ethoxy)ethoxy)propylmethylsiloxane]], docusate sodium (sodium 1,4-bis(2-ethylhexoxy)-1,4-dioxobutane-2-sulfonate), the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from Dow), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), the like, and any combination thereof.

The emulsion stabilizer may be included in the mixture (e.g., mixture 352 of FIG. 3) in an amount of about 0.01 wt % to about 10 wt %, or about 0.01 wt % to about 1 wt %, or about 0.1 wt % to about 3 wt %, or about 1 wt % to about 5 wt %, or about 5 wt % to about 10 wt % based on a total weight of thermoplastic polymer in the mixture. The emulsion stabilizer may be present in similar concentrations in the thermoplastic polymer particles.

Surfactants may be included in the mixture (e.g., mixture 352 of FIG. 3) in an amount of about 0.01 wt % to about 10 wt %, or about 0.01 wt % to about 1 wt %, or about 0.5 wt % to about 2 wt %, or about 1 wt % to about 3 wt %, or about 2 wt % to about 5 wt %, or about 5 wt % to about 10 wt % based on a total weight of thermoplastic polymer in the mixture. Alternatively, the mixture may comprise no (or be absent of) surfactant.

A weight ratio of nanoparticles to surfactant in the emulsion stabilizer in the mixture (e.g., mixture 352 of FIG. 3) may be about 1:10 to about 10:1, or about 1:10 to about 1:1, or about 1:5 to about 5:1, or about 1:1 to about 10:1.

Referring still to FIG. 3, at least a portion of combining 350 may occur in a mixing apparatus used for the processing and/or in another suitable vessel. By way of non-limiting example, thermoplastic polymer 342 may be heated to a temperature greater than the melting point or softening temperature in the mixing apparatus used for the processing, and the emulsion stabilizer may be dispersed in the carrier fluid in another vessel. Then, the dispersion may be added to the melt in the mixing apparatus used for the processing.

Mixture 352 is then processed 354 by applying sufficiently high shear to mixture 352 at a temperature greater than the melting point or softening temperature of thermoplastic polymer 342 to form melt emulsion 356. The shear rate should be sufficient enough to disperse the polymer melt (e.g., comprising thermoplastic polymer 342) in carrier fluid 344 as liquefied droplets (i.e., as melt emulsion 356). Without being limited by theory, it is believed that, all other factors being the same, increasing shear should decrease the size of the liquefied droplets of the polymer melt in carrier fluid 344. However, at some point there may be diminishing returns on increasing shear and decreasing droplet size or there may be disruptions to the droplet contents that decrease the quality of particles produced therefrom.

Mixing apparatuses used for processing 354 to produce melt emulsion 356 may be capable of maintaining melt emulsion 356 at a temperature greater than the melting point or softening temperature of the thermoplastic polymer(s) in mixture 352 (e.g., the one or more polymers of the thermoplastic polymer 342) described herein and applying a shear rate sufficient to disperse the polymer melt in the carrier fluid as droplets.

Examples of mixing apparatuses used for the processing to produce the melt emulsion may include, but are not limited to, extruders (e.g., continuous extruders, batch extruders, and the like), stirred reactors, blenders, reactors with inline homogenizer systems, the like, and apparatuses derived therefrom.

The temperature of the processing and forming the melt emulsion is a temperature greater than the melting point or softening temperature of the thermoplastic polymer(s) in mixture 352 described herein and less than the decomposition temperature of any components in the mixture specified above. For example, the temperature of processing 354 and forming melt emulsion 356 may be about 1° C. to about 50° C., or about 1° C. to about 25° C., or about 5° C. to about 30° C., or about 20° C. to about 50° C. greater than the melting point or softening temperature of the thermoplastic polymer(s) in the mixture described herein, provided the temperature of processing and forming the melt emulsion is less than the decomposition temperature of any components in the mixture.

The shear rate of processing 354 and forming melt emulsion 356 is sufficiently high to disperse the polymer melt in the carrier fluid as liquefied droplets. The liquefied droplets may have a diameter of about 1000 μm or less, or about 1 μm to about 1000 μm, or about 1 μm to about 50 μm, or about 10 μm to about 100 μm, or about 10 μm to about 250 μm, or about 50 μm to about 500 μm, or about 250 μm to about 750 μm, or about 500 μm to about 1000 μm. Thermoplastic polymer particles may be formed in the same range of particle diameters.

The time for maintaining the temperature and shear rate for processing 354 and forming melt emulsion 356 may be about 10 seconds to about 18 hours or longer, or about 10 seconds to about 30 minutes, or about 5 minutes to about 1 hour, or about 15 minutes to about 2 hours, or about 1 hour to about 6 hours, or about 3 hours to about 18 hours. Without being limited by theory, it is believed that once a steady state of droplet sizes is reached, processing can be stopped. That time may depend on, among other things, the temperature, shear rate, and the components in mixture 352.

The melt emulsion 356 inside and/or outside the mixing vessel is then cooled 358 to solidify the liquefied droplets into thermoplastic polymer particles 364. Cooling 358 can be slow (e.g., allowing the melt emulsion to cool under ambient conditions, optionally with further temperature regulation to slow the cooling rate) to fast (e.g., quenching). For example, the rate of cooling may range from about 10° C./hour to about 100° C./second to almost instantaneous with quenching (for example in dry ice), or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second.

During cooling 358, little to no shear may be applied to the melt emulsion. In some instances, the shear applied during heating may be applied during cooling 358.

Cooled mixture 360 resulting from cooling 358 melt emulsion 356 may comprise solidified polymer particles and other components (e.g., the carrier fluid, excess emulsion stabilizer, and the like). The solidified polymer particles 364 may be dispersed in the carrier fluid and/or settled in the carrier fluid. Cooled mixture 360 can then be treated 362 to isolate thermoplastic polymer particles 364 from other components 366 (e.g., carrier fluid 344, excess emulsion stabilizer 346, and the like) and wash or otherwise purify thermoplastic polymer particles 364.

When used, emulsion stabilizers may be at the interface between the polymer melt and the carrier fluid in the melt emulsion. As a result, when the mixture is cooled, the emulsion stabilizers remain at, or in the vicinity of, said interface. Therefore, the resulting thermoplastic polymer particles may include emulsion stabilizers (a) dispersed on an outer surface of the thermoplastic polymer particles and/or (b) embedded in an outer portion (e.g., outer 1 vol %) of the thermoplastic polymer particles. That is, emulsion stabilizers, when included, may be deposited (or located) on the surface of the thermoplastic polymer particles. In some instances, which may be dependent upon non-limiting factors such as the temperature (including cooling rate), the type of thermoplastic polymer, and the types and sizes of emulsion stabilizers, the emulsion stabilizers may become at least partially embedded within the outer surface of the thermoplastic polymer particles. Even without embedment taking place, at least a portion of the emulsion stabilizers may remain robustly associated with the thermoplastic polymer particles to facilitate their further use. In contrast, dry blending already formed polymer particulates (e.g., formed by cryogenic grinding or precipitation processes) with a flow aid like silica nanoparticles does not result in a robust, uniform coating of the flow aid upon the polymer particles.

At least a portion of a surfactant, if used during melt emulsification, may also be associated with the outer surface of the thermoplastic polymer particles as well.

Further, where voids form inside the liquefied droplets, emulsion stabilizers may be present at (and/or embedded in) the interface between the interior of the void and the thermoplastic polymer. The voids generally do not contain polymer. Rather, the voids may contain, for example, carrier fluid, air, or be void (empty). The thermoplastic polymer particles described herein may comprise carrier fluid at about 5 wt % or less, or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt % of the thermoplastic polymer particles.

The thermoplastic polymer particles 364 may comprise thermoplastic polymer 342, at least a portion of the emulsion stabilizer 346 (when included, and which may be at and/or embedded in the outer surface of the thermoplastic polymer particles 364), and the other additives 348 (e.g., a compatibilizer, two-dimensional conductive nanoparticles, etc.) (when included). At least a portion of emulsion stabilizer 346 may be removed prior to metallization according to the disclosure herein.

The thermoplastic polymer particles 364 may optionally be further purified or otherwise treated 368 to yield purified thermoplastic polymer particles 370. Suitable treatments include, but are not limited to, washing, filtering, centrifuging, decanting, the like, and any combination thereof.

Advantageously, carrier fluids and washing solvents of the systems and methods described herein can be recycled and reused, if desired.

The thermoplastic polymer particles may be washed with water to remove surfactant, if present, while retaining substantially all of the emulsion stabilizer associated with the outer surface of the thermoplastic polymer particles. Alternatively, washing may be used to remove some or all of the emulsion stabilizer from the surface of the thermoplastic polymer particles. For example, silica nanoparticle emulsion stabilizers may be at least partially removed by washing the thermoplastic polymer particles with an aqueous base. For surfactants, pyrolysis may be used in addition to or an alternative to washing, depending on the thermoplastic polymer.

Solvents used for washing the thermoplastic polymer particles may be chosen to be (a) miscible with the carrier fluid and (b) nonreactive (e.g., non-swelling and non-dissolving) with the polymer(s) of the thermoplastic polymer particles. Examples of suitable solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, the like, and any combination thereof.

Solvent may be removed from the thermoplastic polymer particles by drying using an appropriate method such as air-drying, heat-drying, reduced pressure drying, freeze drying, or a hybrid thereof. Heating may be performed at a temperature lower than the glass transition temperature of the polymer (e.g., about 50° C. to about 150° C.).

When using thermoplastic polymer particles produced by melt emulsification for making metallized polymer particles, the emulsion stabilizers may remain upon the outer surface of the thermoplastic polymer particles or at least a portion of the emulsion stabilizers may be removed, including such that no or a minimal amount of emulsion stabilizers remain present on the thermoplastic polymer particles. Without being limited by theory, it is believed that emulsion stabilizers that are electrically insulating (e.g., silica, titania, and the like) may reduce the amount of metal that may be added to the metal coating of the thermoplastic polymer particles via electroless plating. Further, surfactants may interfere with the chemistry of the electroless plating and also mitigate the deposition of metal as well. Therefore, decreasing the amount of emulsion stabilizers and other components on the surface of the thermoplastic polymer particles may be desirable.

Emulsion stabilizers (e.g., surfactants and/or nanoparticles) may be disposed substantially uniformly upon the outer surface of the thermoplastic polymer particles. The term "substantially uniform" refers to an even thickness in surface locations covered by the emulsion stabilizer, particularly the entirety of the outer surface. The emulsion stabilizers may cover at least about 5%, or about 5% to about 100%, or about 5% to about 25%, or about 20% to about 50%, or about 40% to about 70%, or about 50% to about 80%, or about 60% to about 90%, or about 70% to about 100% of the surface area of the thermoplastic polymer particles. When purified to at least partially remove surfactant or another emulsion stabilizer, the emulsion stabilizers may be present on an outer surface of the thermoplastic polymer particles at less than 25%, or 0% to about 25%, or about 0.1% to about 5%, or about 0.1% to about 1%, or about 1% to about 5%, or about 1% to about 10%, or about 5% to about 15%, or about 10% to about 25% of the surface area of the polymer particles. The coverage of the emulsion stabilizers on an outer surface of the thermoplastic polymer particles may be determined using image analysis of the scanning electron microscope images (SEM micrographs).

The thermoplastic polymer particles, after separation from the other components, may optionally be further purified or otherwise treated. For example, to narrow the particle size distribution (or to reduce the diameter span), the thermoplastic polymer particles can be passed through a sieve having a pore size of about 10 μm to about 250 μm, or about 10 μm to about 100 μm, or about 50 μm to about 200 μm, or about 150 μm to about 250 μm. Similarly metallized polymer particles may be sieved as well and in similar size ranges.

Further, the polymer particles may be blended with additives to achieve a desired final product. For clarity, because such additives are blended with the polymer particles described herein after the particles are solidified, such additives are referred to herein as "external additives." Examples of external additives include flow aids, other polymer particles, fillers, the like, and any combination thereof.

A weight ratio of nanoparticle emulsion stabilizer to surfactant in the emulsion stabilizer in the thermoplastic polymer particles may be about 1:10 to about 10:1, or about 1:10 to about 1:1, or about 1:5 to about 5:1, or about 1:1 to about 10:1.

Surfactants may be included in the thermoplastic polymer particles in an amount of about 0.01 wt % to about 10 wt %, or about 0.01 wt % to about 1 wt %, or about 0.5 wt % to about 2 wt %, or about 1 wt % to about 3 wt %, or about 2 wt % to about 5 wt %, or about 5 wt % to about 10 wt % based on a total weight of thermoplastic polymer in the polymer particles. Alternatively, the mixture may comprise no (or be absent of) surfactant.

The thermoplastic polymer particles may have a BET surface area of about 10 $m^2/g$ to about 500 $m^2/g$, or about 10 $m^2/g$ to about 150 $m^2/g$, or about 25 $m^2/g$ to about 100 $m^2/g$, or about 100 $m^2/g$ to about 250 $m^2/g$, or about 250 $m^2/g$ to about 500 $m^2/g$.

The thermoplastic polymer particles may have a $D_{10}$ of about 0.1 μm to about 125 μm, or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm, a $D_{50}$ of about 0.5 μm to about 200 μm, or about 0.5 μm to about 10 μm, or about 5 μm to about 50 μm, or about 30 μm to about 100 μm, or about 30 μm to about 70 μm, or about 25 μm to about 50 μm, or about 50 μm to about 100 μm, or about 75 μm to about 150 μm, or about 100 μm to about 200 μm, and a $D_{90}$ of about 3 μm to about 300 μm, or about 3 μm to about 15 μm, or about 10 μm to about 50 μm, or about 25 μm to about 75 μm, or about 70 μm to about 200 μm, or about 60 μm to about 150 μm, or about 150 μm to about 300 μm, wherein $D_{10}<D_{50}<D_{90}$. The polymer particles may also have a diameter span of about 0.2 to about 10 (or about 0.2 to about 0.5, or about 0.4 to about 0.8, or about 0.5 to about 1, or about 1 to about 3, or about 2 to about 5, or about 5 to about 10). Without limitation, diameter span values of 1.0 or greater are considered broad, and diameter spans values of 0.75 or less are considered narrow. Preferably, the thermoplastic polymer particles have a diameter span of about 0.2 to about 1.

In a first non-limiting example, the thermoplastic polymer particles may have a $D_{10}$ of about 0.1 μm to about 10 μm, a $D_{50}$ of about 0.5 μm to about 25 μm, and a $D_{90}$ of about 3 μm to about 50 μm, wherein $D_{10}<D_{50}<D_{90}$. The polymer particles may have a diameter span of about 0.2 to about 2.

In a second non-limiting example, the thermoplastic polymer particles may have a $D_{10}$ of about 5 μm to about 30 μm, a $D_{50}$ of about 30 μm to about 70 μm, and a $D_{90}$ of about 70 μm to about 120 μm, wherein $D_{10}<D_{50}<D_{90}$. The polymer particles may have a diameter span of about 1.0 to about 2.5.

In a third non-limiting example, the thermoplastic polymer particles may have a $D_{10}$ of about 25 μm to about 60 μm, a $D_{50}$ of about 60 μm to about 110 μm, and a $D_{90}$ of about 110 μm to about 175 μm, wherein $D_{10}<D_{50}<D_{90}$. The polymer particles may have a diameter span of about 0.6 to about 1.5.

In a fourth non-limiting example, the thermoplastic polymer particles may have a $D_{10}$ of about 75 μm to about 125 μm, a $D_{50}$ of about 100 μm to about 200 μm, and a $D_{90}$ of about 125 μm to about 300 μm, wherein $D_{10}<D_{50}<D_{90}$. Said polymer particles may have a diameter span of about 0.2 to about 1.2.

In a fifth non-limiting example, the thermoplastic polymer particles may have a $D_{10}$ of about 1 μm to about 50 μm, or about 5 μm to about 30 μm, or about 1 μm to about 25 μm, or about 25 μm to about 50 μm, a $D_{50}$ of about 25 μm to about 100 μm, or about 30 μm to about 100 μm, or about 30 μm to about 70 μm, or about 25 μm to about 50 μm, or about 50 μm to about 100 μm, and a $D_{90}$ of about 60 μm to about 300 μm, or about 70 μm to about 200 μm, or about 60 μm to about 150 μm, or about 150 μm to about 300 μm, wherein $D_{10}<D_{50}<D_{90}$. The polymer particles may also have a diameter span of about 0.4 to about 3, or about 0.6 to about 2, or about 0.4 to about 1.5, or about 1 to about 3.

The thermoplastic polymer particles may have a circularity of about 0.9 or greater, or about 0.90 to about 1.0, or about 0.93 to about 0.99, or about 0.95 to about 0.99, or about 0.97 to about 0.99, or about 0.98 to 1.0.

The thermoplastic polymer particles may have an angle of repose of about 25° to about 45°, or about 25° to about 35°, or about 30° to about 40°, or about 35° to about 45°.

The thermoplastic polymer particles may have a Hausner ratio of about 1.0 to about 1.5, or about 1.0 to about 1.2, or about 1.1 to about 1.3, or about 1.2 to about 1.35, or about 1.3 to about 1.5.

The thermoplastic polymer particles may have a bulk density of about 0.3 $g/cm^3$ to about 0.8 $g/cm^3$, or about 0.3 $g/cm^3$ to about 0.6 $g/cm^3$, or about 0.4 $g/cm^3$ to about 0.7 $g/cm^3$, or about 0.5 $g/cm^3$ to about 0.6 $g/cm^3$, or about 0.5 $g/cm^3$ to about 0.8 $g/cm^3$.

The thermoplastic polymer particles may have an aerated density of about 0.5 $g/cm^3$ to about 0.8 $g/cm^3$, or about 0.5 $g/cm^3$ to about 0.7 $g/cm^3$, or about 0.55 $g/cm^3$ to about 0.80 $g/cm^3$.

The thermoplastic polymer particles may have a tapped density of about 0.6 $g/cm^3$ to about 0.9 $g/cm^3$, or about 0.60 $g/cm^3$ to about 0.75 $g/cm^3$, or about 0.65 $g/cm^3$ to about 0.80 $g/cm^3$, or about 0.70 $g/cm^3$ to about 0.90 $g/cm^3$.

Depending on the temperature and shear rate of processing and the composition and relative concentrations of the components (e.g., thermoplastic polymer, the carrier fluid, excess emulsion stabilizer, and the like) different shapes of the thermoplastic polymer particles may be produced. Typically, the thermoplastic polymer particles may comprise substantially spherical particles having a circularity of about 0.97 or greater. However, other structures including disc and elongated structures may be observed in the polymer particles. Therefore, the polymer particles may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The polymer particles may have a sintering window that is within 10° C., preferably within 5° C., of the sintering window of the thermoplastic polymer or blend thereof used in the mixture.

Compatibilizers may optionally be used to improve the blending efficiency and efficacy when two or more thermoplastic polymers are used. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

Applications of Polymer Particles

The metallized polymer particles described herein may be used to produce a variety of articles including additive manufacturing produced articles, conductive adhesives, conductive pastes, heat-transfer potting compounds, and the like.

The metallized polymer particles described herein may be used for additive manufacturing processes, such as selective laser sintering. Such processes may comprise depositing in a powder bed a particulate composition comprising a first plurality of particles comprising metallized polymer particles, as described herein, and optionally, a second plurality of particles comprising thermoplastic polymer particles lacking a metal coating; and consolidating at least a portion of the particulate composition in the powder bed to form a consolidated body. Consolidation may take place through selective laser sintering. Example selective laser sintering processes may comprise: depositing metallized polymer particles described herein and optionally, thermoplastic polymer particles different than the metallized polymer particles onto a surface; and once deposited, exposing at least a portion of the particles (the metallized polymer particles and optionally the thermoplastic polymer particles lacking a metal coating) to a laser to fuse the particles together and form a consolidated body. The metallized polymer particles and the thermoplastic polymer particles may be different from each other in a variety of ways. For example, the same thermoplastic polymer may be used in both the metallized polymer particles and the thermoplastic polymer particles where the particles differ by being metallized versus not being metallized. In another example, the thermoplastic polymers of the particles may be different and/or the particle sizes may be different.

In another example, the metallized polymer particles described herein may be utilized directly in additive manufacturing without thermoplastic polymer particles lacking a metal coating being present. For example, if the areal coverage of the metal coating upon the metallized polymer particles is sufficiently small (e.g., <50% coverage, or <30% coverage, or <10% coverage), the metallized polymer particles may be printed directly without thermoplastic polymer particles lacking a metal coating being present.

Further optionally, the metallized polymer particles described herein may be deposited within a particulate composition comprising a first plurality of particles comprising metallized polymer particles, as described herein, and optionally, a second plurality of particles comprising thermoplastic polymer particles lacking a metal coating; and consolidating at least a portion of the particulate composition to form a consolidated body. Such depositing and consolidating may take place within an additive manufacturing process or a powder coating process. Optionally, further sintering may take place to form a metal coating upon the consolidated body.

The consolidated body may have a void percentage of about 5% or less (e.g., 0% to about 5%, or about 0.5% to about 2%, or about 1% to about 3%, or about 2% to about 5%) after being consolidated.

When using metallized polymer particles described herein and thermoplastic polymer particles different than the metallized polymer particles together in additive manufacturing, a weight ratio of metallized polymer particles to thermoplastic polymer particles may range from about 10:1 to about 1:100. Without being limited by theory, it is believed that higher percent coverage of the metallized polymer particles with the coating comprising the first and second transition metals may need more thermoplastic polymer particles to produce a consolidated body in additive manufacturing. It is to be appreciated, however, that even metallized polymer particles having a complete (100%) surface coating may be consolidated even without other thermoplastic polymer particles being present.

Examples of articles that may be produced by additive manufacturing methods where the metallized polymer particles and thermoplastic polymer particles are used to form all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3D printing, and the like.

The metallized polymer particles described herein may be used in applications beyond additive manufacturing. For example, the polymer particles may be used in conductive adhesives, conductive pastes, heat-transfer potting compounds, and the like.

For example, a conductive adhesive may comprise metallized polymer particles and an adhesive. In another example, a conductive paste (also known as a conductive paint) may comprise metallized polymer particles, an adhesive, and a volatile solvent. In use, the volatile solvent may evaporate leaving the metallized polymer particles adhered to a surface. The metallized polymer particle may be further sintered to create a metal coating upon the surface. In yet another example, a heat-transfer potting compound may comprise: metallized polymer particles and an epoxy. In any of the foregoing, the metallized polymer particles may be present in an amount of about 1 wt % or above, or about 5 wt % or above, or about 10 wt % or above.

Embodiments Disclosed Herein Include

A. Metallized polymer particle compositions. The compositions comprise: polymer particles; and a metal coating on an outer surface of at least a portion of the polymer particles, the metal coating comprising a plating metal and overlaying a plurality of two-dimensional conductive nanoparticles and a catalyst metal.

B. Methods for making metallized polymer particle compositions. The methods comprise: providing polymer particles comprising a plurality of two-dimensional conductive nanoparticles and a catalyst metal on an outer surface of at least a portion of the polymer particles; and performing electroless plating upon the outer surface of the polymer particles using a plating metal precursor to form metallized polymer particles having a metal coating upon the outer surface of the polymer particles; wherein the metal coating comprises a plating metal and overlays the plurality of two-dimensional conductive nanoparticles and the catalyst metal.

C. Metal coating processes. The processes comprise: depositing a particulate composition comprising a first plurality of particles comprising the metallized polymer particle composition of A and optionally a second plurality of particles comprising thermoplastic polymer particles lacking a metal coating; and consolidating a portion of the particulate composition to form a consolidated body comprising a metal.

C1. The process of C, wherein depositing and consolidating take place in a powder bed.

D. Conductive adhesives. The conductive adhesives comprise: a plurality of the metallized polymer particles; and an adhesive.

E. Conductive pastes. The conductive pastes comprise: a plurality of the metallized polymer particles; an adhesive; and a volatile solvent.

F. Heat-transfer potting compounds. The heat-transfer potting compounds comprise: a plurality of the metallized polymer particles; and an epoxy.

Embodiments A-F may have one or more of the following additional elements in any combination:

Element 1: wherein the plurality of two-dimensional conductive nanoparticles comprises a nanoparticle selected from the group consisting of graphene, reduced graphene oxide, a two-dimensional transition metal compound, and any combination thereof.

Element 2: wherein the plurality of two-dimensional conductive nanoparticles comprise a MXene having a layered structure selected from the group consisting of a transition metal carbide, a transition metal nitride, a transition metal carbonitride, and any combination thereof.

Element 3: wherein the composition further comprises an adhesion promoter interposed between the outer surface of the polymer particles and the two-dimensional conductive nanoparticles, and optionally the adhesion promoter is selected from the group consisting of a dopamine or a silane coupling agent.

Element 3A: wherein an adhesion promoter is interposed between the outer surface of the polymer particles and the two-dimensional conductive nanoparticles.

Element 4: wherein the plurality of two-dimensional conductive nanoparticles is localized at an interface of the metal coating and the outer surface of the polymer particles.

Element 5: wherein the plurality of two-dimensional conductive nanoparticles are present at about 0.00001 wt % to about 0.1 wt % relative to a mass of plating metal in the metal coating, and/or an areal coverage of the plurality of two-dimensional conductive nanoparticles upon the polymer particles ranges from about 5% to about 100%, and/or a mass ratio of the plurality of two-dimensional conductive nanoparticles to surface area upon the polymer particles ranges from about 0.01 $\mu g/cm^2$ to about 10 $\mu g/cm^2$, and/or a mass ratio of the plurality of two-dimensional conductive nanoparticles to the catalyst metal ranges from about 1,000:1 to about 1:1,000, and/or a mass ratio of catalyst metal to surface area upon the polymer particles ranges from about 0.01 $\mu g/cm^2$ to about 10 $\mu g/cm^2$, and/or the metal coating comprises about 5 wt % to about 50 wt % of a combined mass of the polymer particles and the metal coating, and/or a mass ratio of the catalyst metal to the plating metal ranges from about 1:5 to about 1:100.

Element 6: wherein the metal coating is a continuous metal coating enveloping the thermoplastic polymer particles, or the metal coating covers about 10% to about 100% of the outer surface of the thermoplastic polymer particles by area.

Element 7: wherein the polymer particles comprise thermoplastic polymer particles.

Element 8: wherein the metal coating has a thickness ranging from about 0.005 µm to about 10 µm.

Element 9: wherein the catalyst metal comprises at least one of copper, silver, platinum, or palladium.

Element 10: wherein the plating metal comprises at least one of copper, silver, gold, chromium, nickel, or any alloy thereof.

Element 11: wherein the polymer particles are substantially free of silica, optionally wherein the polymer particles comprise thermoplastic polymer particles.

Element 12: wherein the method further comprises depositing the catalyst metal upon at least a portion of the outer surface of the polymer particles; and wherein depositing the catalyst metal comprises contacting the polymer particles with a catalyst metal precursor and a first reducing agent, and performing electroless plating comprises reducing the plating metal precursor with a second reducing agent, the second reducing agent being the same as or different than the first reducing agent.

Element 13: wherein the polymer particles comprise thermoplastic polymer particles and providing the polymer particles comprises: combining a thermoplastic polymer and optionally an emulsion stabilizer in a carrier fluid at a heating temperature at or above a melting point or softening temperature of the thermoplastic polymer, and applying sufficient shear to disperse the thermoplastic polymer as liquefied droplets in the carrier fluid; cooling the liquefied droplets below the melting point or softening temperature to form the thermoplastic polymer particles; separating the thermoplastic polymer particles from the carrier fluid; and optionally, removing the emulsion stabilizer from the thermoplastic polymer particles.

Element 14: wherein the emulsion stabilizer is combined with the thermoplastic polymer and comprises a plurality of silica nanoparticles.

Element 15: wherein providing the polymer particles comprises depositing the plurality of two-dimensional conductive nanoparticles upon the outer surface of a polymer particles lacking a surface coating.

Element 16: wherein consolidating takes place using a laser.

Element 17: wherein the consolidated body has a void percentage of about 5% or less.

By way of non-limiting example, illustrative combinations applicable to one or more of A-F may include, but are not limited to, 1 or 2, and 3 or 3A; 1 or 2, and 4; 1 or 2, and 5; 1 or 2, and 6 or 7; 1 or 2, and 8; 1 or 2, and 9; 1 or 2, 9 and 10; 1 or 2, and 11; 3 or 3A, and 4; 3 or 3A, and 5; 3 or 3A, and 6 or 7; 3 or 3A, and 8; 3 or 3A, and 9; 3 or 3A, 9 and 10; 3 or 3A, and 11; 4 and 5; 4, and 6 or 7; 4 and 8; 4 and 9; 4, 9 and 10; 4 and 11; 5, and 6 or 7; 5 and 8; 5 and 9; 5, 9 and 10; 5 and 11; 6 or 7, and 8; 6 or 7, and 9; 6 or 7, 9 and 10; 6 or 7, and 11; 8 and 9; 8, 9 and 10; 8 and 11; 9 and 11; 10 and 11; and 9-11. Additional illustrative embodiments applicable to B and C include, but are not limited to, any of the foregoing in further combination with 12, 13, 14, 15, 16 or 17; any one or more of 1, 2, 3, 3A, 4, 5, 6, 7, 8, 9, 10, or 11 in further combination with 12, 13, 14, 15, 16, or 17; 12 and 13; 12-14; 12 and 15; and 16 and 17.

To facilitate a better understanding of the embodiments of the present invention, the following examples of preferred or representative embodiments are given. In no way should the following examples be read to limit, or to define, the scope of the invention.

EXAMPLES

In the following examples, thermoplastic polymer particles produced by melt emulsification of polyamide 12 were used. More specifically, melt emulsification was performed using 30,000 cSt PDMS, polyamide 12, and 0.35 wt % AEROSIL® R812S silica nanoparticles by mass of the polyamide 12. In the following examples, these particles are referred to as polyamide particles. The polyamide particles had a $D_{50}$ of 45.5 µm and a geometric standard deviation of 1.393. Unless otherwise specified, parts in the following examples refer to parts by weight.

Example 1

Figures 4A, 4B:
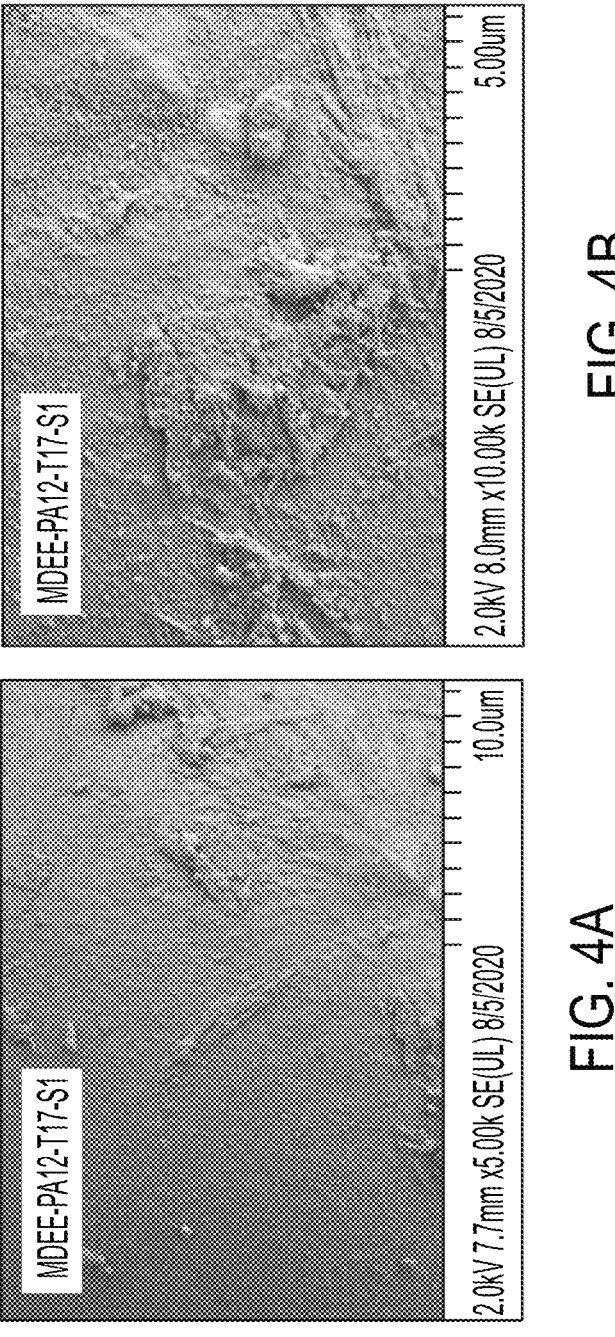
FIGS. 4A and 4B are scanning electron microscopy (SEM) images of untreated polyamide particles.
Figures 5A, 5B:
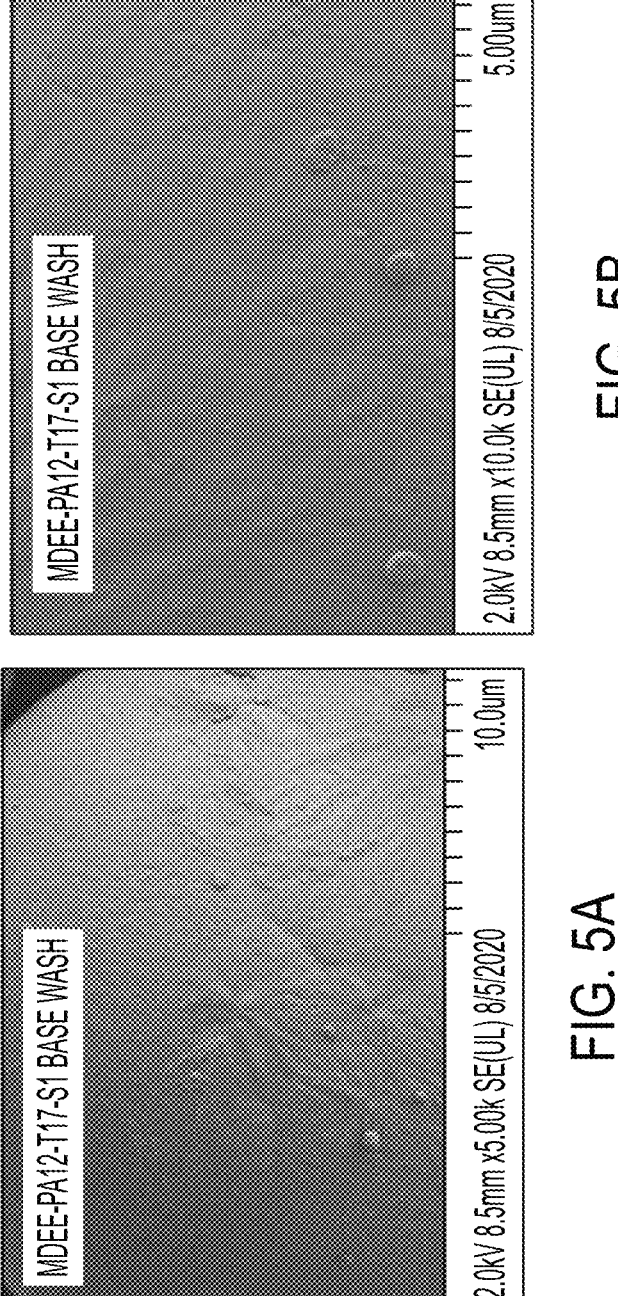
FIGS. 5A and 5B are SEM images of post-treated polyamide particles.

The polyamide particles were first treated to remove a substantial amount of the silica from the particle surfaces. First, 5 parts of the polyamide particles were added into 30 parts of 10% (w/w) sodium hydroxide aqueous solution. The slurry was then stirred at 60° C. for 15 minutes and filtered to collect the polyamide particles, followed by rising with deionized water and methanol. The resultant post-treated polyamide particles were dried in a fume hood overnight. FIGS. 4A and 4B are scanning electron microscopy (SEM) images of untreated polyamide particles. FIGS. 5A and 5B are SEM images of post-treated polyamide particles. Comparison of these images showed removal of a substantial amount of the silica nanoparticles from the surface of the polyamide particles.

Example 2

The post-treated polyamide particles were then coated by an electroless plating process. First, a palladium catalyst was deposited on the surface of the post-treated polyamide particles as follows. Two parts of the post-treated polyamide particles were mixed under gentle stirring with 5 parts of 1.5 mM palladium chloride (PdCl$_2$) solution at ambient temperature for about 10 seconds. The polyamide particles were then collected by screening with a 20 µm sieve and air-dried in a fume hood. The resultant dried particles were mixed with 10 parts of 0.2 M NaH$_2$PO$_2$ solution for about 5 minutes and then collected by filtration. Optionally, exposure to the palladium salt and the reducing agent may be repeated.

One part of the resulting Pd-loaded polyamide particles was added into 5 parts of a nickel solution containing sodium citrate (0.2 M), boric acid (0.5 M), nickel (II) sulphate hexahydrate (15 g/L), and sodium hypophosphite monohydrate (25 g/L). The pH of the nickel solution was adjusted to 9.0 using 10% (w/w) sodium hydroxide solution. The electroless plating was carried out at 60° C. with gentle stirring for about 20 minutes. The resultant metallized polyamide particles containing a nickel coating (also containing the Pd catalyst) were collected by filtration and air-dried in a fume hood.

Figures 6A, 6B:
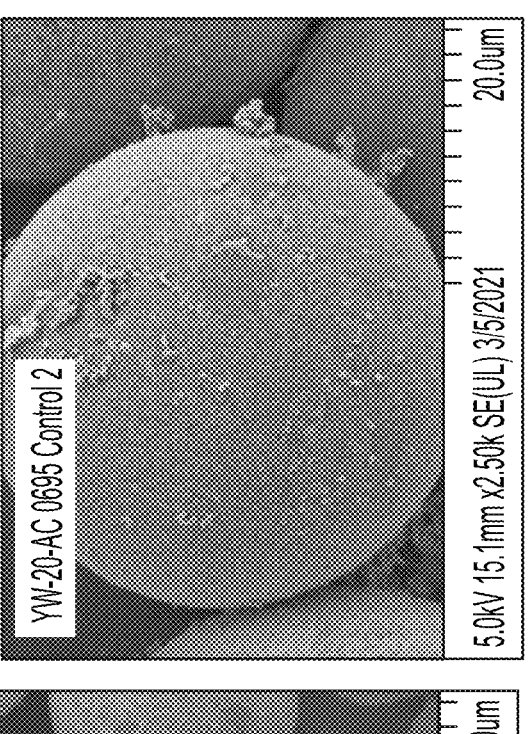
FIGS. 6A and 6B are SEM images of metallized polyamide particles containing a nickel coating.

FIGS. 6A and 6B are SEM images of metallized polyamide particles containing a nickel coating. As compared to post-treated polyamide particles (FIGS. 5A and 5B), the nickel coating was evident in the SEM images of FIGS. 6A and 6B. The coating appeared to cover a significant portion of the surface of the polyamide particles.

Example 3

The post-treated polyamide particles were coated by an electroless plating process where two-dimensional conductive nanoparticles were used in addition to palladium. Two parts of post-treated polyamide particles were mixed with 10 parts of graphene oxide dispersion (containing 0.2 mg graphene oxide/mL in water) with stirring for about one minute. After exposure to the graphene oxide, the polyamide particles were collected by screening with a 20 μm sieve and air-dried. The polyamide particles were then treated with 10 parts of 0.2 M $NaH_2PO_2$ solution to reduce the graphene oxide to rGO (reduced graphene oxide). The graphene oxide deposition and reduction operations may be repeated. The polyamide particles having rGO thereon were then exposed to palladium chloride (1.5 mM aqueous solution) and a $NaH_2PO_2$ reducing agent as described in Example 2.

Figures 7A, 7B:
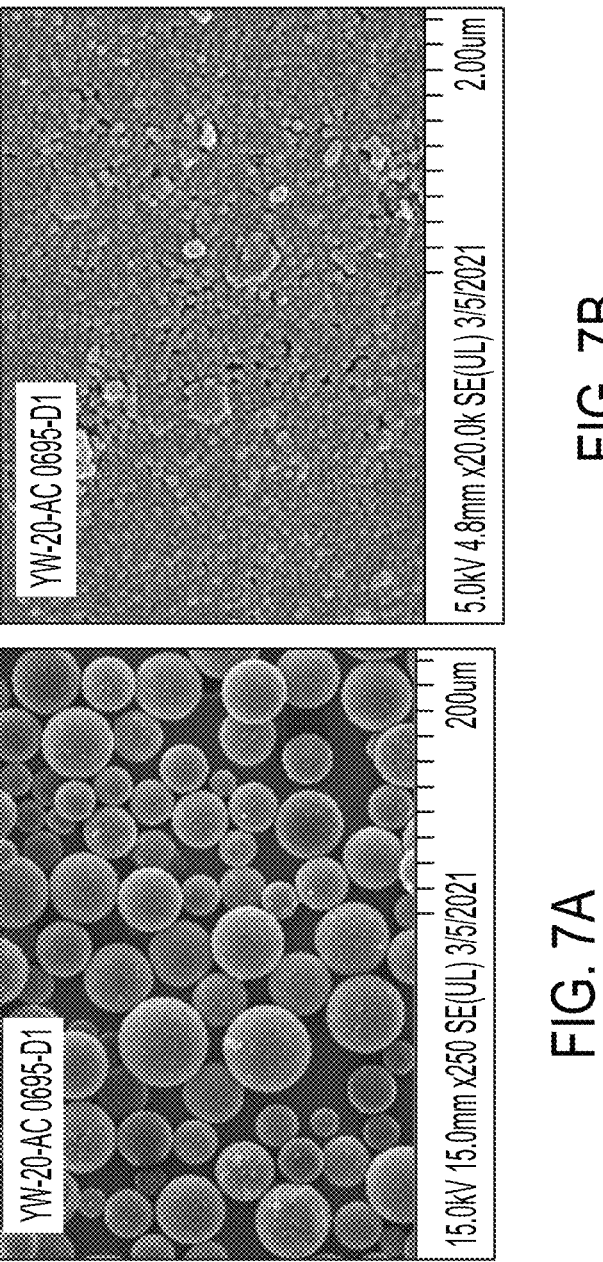
FIGS. 7A and 7B are SEM images of metallized polyamide particles containing a nickel coating prepared in the presence of reduced graphene oxide.

After deposition of Pd, the polyamide particles were electrolessly plated as described in Example 2, except that the electroless plating process lasted for only 3 minutes rather than 20 minutes. FIGS. 7A and 7B are SEM images of metallized polyamide particles containing a nickel coating prepared in the presence of reduced graphene oxide. As compared to the post-treated polyamide particles (FIGS. 5A and 5B), the nickel coating can be observed in the SEM images of FIGS. 7A and 7B. Further, as compared to the metallized polyamide particles produced in the absence of rGO (FIGS. 6A and 6B, Example 2), the nickel coating appeared to be thicker and more even when the rGO was present.

Example 4

Metallized polyamide particles were obtained as described in Example 3, except that a lower concentration palladium chloride solution (30 μM) was used for deposition of the catalyst.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A metallized polymer particle composition comprising:
   polymer particles comprising thermoplastic polymer particles; and
   a metal coating on an outer surface of at least a portion of the polymer particles, the metal coating comprising a plating metal that overlays a plurality of two-dimensional conductive nanoparticles and a catalyst metal;
       wherein the thermoplastic polymer particles have a circularity of about 0.90 or greater; and
       wherein the thermoplastic polymer particles comprise a thermoplastic polymer selected from the group consisting of a polyamide, a polyurethane, a polyacetal, a polycarbonate, polybutylene terephthalate (PBT), polyethylene terephthalate (PET), polyethylene naphthalate (PEN), polytrimethylene terephthalate (PTT), polyhexamethylene terephthalate, a polyester, polylactic acid, a polyether, a polyether sulfone, a polyetherether ketone, a polyimide, a polyphenylene sulfide, a polyarylene ether, a polyarylene sulfide, a polysulfone, a polyether ketone, a polyamide-imide, a polyetherimide, a polyetherester, a chlorinated or chlorosulphonated polyethylene, a phenolic resin, a silicone, and any combination thereof.

2. The metallized polymer particle composition of claim 1, wherein the plurality of two-dimensional conductive nanoparticles comprises a nanoparticle selected from the group consisting of graphene, reduced graphene oxide, a two-dimensional transition metal compound, and any combination thereof.

3. The metallized polymer particle composition of claim 1, wherein the plurality of two-dimensional conductive nanoparticles comprises a MXene having a layered structure selected from the group consisting of a transition metal carbide, a transition metal nitride, a transition metal carbonitride, and any combination thereof.

4. The metallized polymer particle composition of claim 3, wherein the MXene further comprises a surface terminating group selected from the group consisting of a hydrogen, an oxygen, a sulfur, a hydroxyl, a halide, and any combination thereof.

5. The metallized polymer particle composition of claim 3, wherein the MXene further comprises a surface terminating group selected from the group consisting of an oxygen, a sulfur, a hydroxyl, a halide, and any combination thereof.

6. The metallized polymer particle composition of claim 1, further comprising:
an adhesion promoter interposed between the outer surface of the polymer particles and the two-dimensional conductive nanoparticles.

7. The metallized polymer particle composition of claim 1, wherein the plurality of two-dimensional conductive nanoparticles is localized at an interface of the metal coating and the outer surface of the polymer particles.

8. The metallized polymer particle composition of claim 1, wherein the plurality of two-dimensional conductive nanoparticles is present at about 0.00001 wt % to about 0.1 wt % relative to a mass of the plating metal in the metal coating.

9. The metallized polymer particle composition of claim 1, wherein a mass ratio of the plurality of two-dimensional conductive nanoparticles to the catalyst metal ranges from about 1,000:1 to about 1:1,000.

10. The metallized polymer particle composition of claim 1, wherein the metal coating has a thickness ranging from about 0.005 μm to about 10 μm.

11. The metallized polymer particle composition of claim 1, wherein the catalyst metal comprises at least one of copper, silver, platinum, or palladium.

12. The metallized polymer particle composition of claim 1, wherein the plating metal comprises at least one of copper, silver, gold, chromium, nickel, or any alloy thereof.

13. A process comprising:
depositing a particulate composition comprising a first plurality of particles comprising the metallized polymer particle composition of claim 1 and optionally a second plurality of particles comprising thermoplastic polymer particles lacking a metal coating; and
consolidating a portion of the particulate composition to form a consolidated body comprising a metal.

14. The metallized polymer particle composition of claim 1, wherein the thermoplastic polymer particles comprise a thermoplastic polymer selected from the group consisting of a polyamide, a polyurethane, and any combination thereof.

15. A method comprising:
providing polymer particles comprising a plurality of two-dimensional conductive nanoparticles and a catalyst metal on an outer surface of at least a portion of the polymer particles;
wherein the polymer particles comprise thermoplastic polymer particles, and the thermoplastic polymer particles have a circularity of about 0.90 or greater; and
wherein the thermoplastic polymer particles comprise a thermoplastic polymer selected from the group consisting of a polyamide, a polyurethane, a polyacetal, a polycarbonate, polybutylene terephthalate (PBT), polyethylene terephthalate (PET), polyethylene naphthalate (PEN), polytrimethylene terephthalate (PTT), polyhexamethylene terephthalate, a polyester, polylactic acid, a polyether, a polyether sulfone, a polyetherether ketone, a polyimide, a polyphenylene sulfide, a polyarylene ether, a polyarylene sulfide, a polysulfone, a polyether ketone, a polyamide-imide, a polyetherimide, a polyetherester, a chlorinated or chlorosulphonated polyethylene, a phenolic resin, a silicone, and any combination thereof; and
performing electroless plating upon the outer surface of the polymer particles using a plating metal precursor to form metallized polymer particles having a metal coating upon the outer surface of the polymer particles;
wherein the metal coating comprises a plating metal that overlays the plurality of two-dimensional conductive nanoparticles and the catalyst metal.

* * * * *